(12) United States Patent
Saur et al.

(10) Patent No.: US 10,540,652 B2
(45) Date of Patent: Jan. 21, 2020

(54) TECHNOLOGY FOR SECURE PARTITIONING AND UPDATING OF A DISTRIBUTED DIGITAL LEDGER

(71) Applicant: Intel Corporation, Santa Clara, CA (US)

(72) Inventors: Karla Saur, Portland, OR (US); Mic Bowman, Beaverton, OR (US); Andrea Miele, Hillsboro, OR (US); James P. Held, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 15/355,918

(22) Filed: Nov. 18, 2016

(65) Prior Publication Data

US 2018/0145836 A1 May 24, 2018

(51) Int. Cl.
*G06Q 20/38* (2012.01)
(52) U.S. Cl.
CPC ..... *G06Q 20/3829* (2013.01); *G06Q 2220/00* (2013.01)
(58) Field of Classification Search
CPC ............. G06Q 20/3829; G06Q 20/223; G06Q 2220/00; H04L 9/3236; H04L 9/3247; H04L 2209/38
USPC ........................................................ 713/176
See application file for complete search history.

(56) References Cited

U.S. PATENT DOCUMENTS

| | | | |
|---|---|---|---|
| 8,572,411 B2 * | 10/2013 | Ginter | G06F 21/10 345/59 |
| 8,972,746 B2 | 3/2015 | Johnson et al. | |
| 9,118,467 B2 * | 8/2015 | Maletsky | H04L 9/3268 |
| 9,397,985 B1 * | 7/2016 | Seger, II | H04L 63/0442 |
| 9,967,333 B2 * | 5/2018 | Chen | H04L 67/104 |
| 2002/0184504 A1 * | 12/2002 | Hughes | H04L 9/3236 713/177 |

(Continued)

FOREIGN PATENT DOCUMENTS

CA 3002034 A1 * 4/2017 ........... H04L 9/3247

OTHER PUBLICATIONS

"Introduction—Sawtooth Lake latest documentation", retrieved from <https://intelledger.github.io/introduction.html> on Oct. 7, 2016, 4 Pages.

(Continued)

*Primary Examiner* — Kambiz Zand
*Assistant Examiner* — Mahabub S Ahmed
(74) *Attorney, Agent, or Firm* — Barnes & Thornburg LLP (57) ABSTRACT

An automated method to verify a block record for a digital ledger involves a first validation node (FVN) which receives a block record from a second validation node (SVN). The block record comprises a digital signature for the block record. In response to receiving the block record, the FVN automatically obtains a node identifier for the SVN, based on the digital signature for the block record. The first validator node uses the node identifier for the SVN to determine whether the SVN belongs to a validation group that comprises the FVN. The FVN uses an attestation service to determine whether the node identifier for the SVN belongs to a node with a trusted processor. The FVN determines whether the digital signature for the block record was created with a private key that corresponds to the node identifier for the SVN.

25 Claims, 4 Drawing Sheets

(56) References Cited

U.S. PATENT DOCUMENTS

| | | | | |
|---|---|---|---|---|
| 2003/0056094 | A1* | 3/2003 | Huitema | H04L 63/04 713/157 |
| 2004/0093493 | A1* | 5/2004 | Bisbee | G06Q 20/00 713/156 |
| 2006/0117181 | A1* | 6/2006 | Brickell | H04L 9/0844 713/176 |
| 2009/0327505 | A1* | 12/2009 | Rao | H04L 9/3236 709/230 |
| 2010/0023768 | A1* | 1/2010 | Lin | H04W 12/06 713/171 |
| 2010/0042824 | A1* | 2/2010 | Lee | G06F 21/6218 713/2 |
| 2011/0035585 | A1* | 2/2011 | Haddad | H04L 63/0414 713/162 |
| 2012/0110337 | A1* | 5/2012 | Murphey | G06F 21/10 713/182 |
| 2013/0007442 | A1* | 1/2013 | Mao | H04L 63/0823 713/156 |
| 2013/0031358 | A1* | 1/2013 | Holland | H04W 12/12 713/153 |
| 2013/0259234 | A1* | 10/2013 | Acar | H04L 9/0833 380/278 |
| 2014/0112470 | A1* | 4/2014 | Shen | G06F 21/57 380/47 |
| 2014/0143536 | A1* | 5/2014 | Holland | H04W 12/12 713/153 |
| 2014/0281500 | A1* | 9/2014 | Ignatchenko | H04L 9/3263 713/156 |
| 2014/0281531 | A1* | 9/2014 | Phegade | H04L 9/083 713/168 |
| 2014/0289363 | A1* | 9/2014 | Sentinelli | H04L 1/00 709/217 |
| 2015/0269539 | A1* | 9/2015 | MacGregor | G06Q 20/065 705/39 |
| 2016/0142213 | A1* | 5/2016 | Deniaud | H04L 63/0823 713/175 |
| 2016/0259937 | A1* | 9/2016 | Ford | G06F 21/554 |
| 2016/0261404 | A1* | 9/2016 | Ford | H04L 9/008 |
| 2016/0321751 | A1* | 11/2016 | Creighton, IV | G06Q 40/04 |
| 2016/0364787 | A1* | 12/2016 | Walker | G06Q 30/0635 |
| 2017/0031676 | A1* | 2/2017 | Cecchetti | G06F 8/65 |
| 2017/0230189 | A1* | 8/2017 | Toll | G06Q 40/04 |
| 2018/0089041 | A1* | 3/2018 | Smith | G06F 11/1474 |
| 2018/0089645 | A1* | 3/2018 | McDonald | G06Q 20/10 |
| 2018/0089655 | A1* | 3/2018 | McDonald | G06Q 20/02 |
| 2018/0101848 | A1* | 4/2018 | Castagna | G06F 9/5016 |
| 2018/0114205 | A1* | 4/2018 | Thomas | G06Q 40/02 |
| 2018/0115538 | A1* | 4/2018 | Blake | H04L 63/10 |
| 2018/0253703 | A1* | 9/2018 | Smith | H04L 9/0861 |
| 2018/0253725 | A1* | 9/2018 | Smith | H04L 9/0861 |
| 2018/0255038 | A1* | 9/2018 | Smith | H04L 9/0861 |
| 2019/0050856 | A1* | 2/2019 | Vintila | G06Q 20/3829 |
| 2019/0149550 | A1* | 5/2019 | Brakeville | H04L 63/101 726/5 |

OTHER PUBLICATIONS

"MarketPlace Data Model—Sawtooth Lake latest documentation", <https://intelledger.github.io/mktplace_developers_guide/mktplace_data_model.html> on Oct. 7, 2016, 15 Pages.

"MarketPlace Messages—Sawtooth Lake latest documentation", <https://intelledger.github.io/mktplace_developers_guide/mktplace_messages.html> on Oct. 6, 2016, 1 Page.

"Elliptic Curves—How does recovering the public key from an ECDSA signature work?", retrieved from <http://crypto.stackexchange.com/questions/18105/how-does-recovering-the-public-key-from-an-ecdsa-signature-work> on Oct. 7, 2016, 2 Pages.

Intel, "Intel® Software Guard Extensions SDK for Windows* OS: Developer Reference", © Intel Corporation 2016, 326 Pages.

Intel Developer Zone, "sgx_get_ket", Intel® Software, retrieved from <https://software.intel.com/en-us/node/696600> on Oct. 21, 2016, 3 Pages.

Mic, et al., "System, Apparatus and Method for Performing Cryptographic Operations in a Trusted Execution Environment", U.S. Appl. No. 14/751,407, filed Jun. 26, 2015, 26 Pages.

Wikipedia, "Enhanced privacy ID", retrieved from <https://en.wikipedia.org/wiki/Enhanced_privacy_ID> on Oct. 14, 2016, 4 Pages.

* cited by examiner

TECHNOLOGY FOR SECURE PARTITIONING AND UPDATING OF A DISTRIBUTED DIGITAL LEDGER

TECHNICAL FIELD

This disclosure pertains in general to security for data processing systems. In particular, this disclosure pertains to methods and apparatus to facilitate secure partitioning and updating of distributed ledgers.

BACKGROUND

A distributed ledger is a database that is stored on multiple different data processing systems and that can be updated by multiple different data processing systems. A distributed ledger may provide a digital record of financial transactions and asset ownership, for instance. Structurally, a distributed ledger may contain multiple block records, and each block record may include multiple transaction records, for example. A transaction record may document a set of one or more financial transactions, for instance. For brevity, block records may be referred to as "blocks," and transaction records may be referred to as "transactions." The data processing systems which interact with the distributed ledger may be referred to as "nodes." For a distributed ledger, multiple different nodes may add new blocks of transactions to the ledger.

If a distributed ledger follows a predetermined standard or protocol which requires each new block to include a link to the previous block, the distributed ledger may be referred to as a "blockchain." In a typical blockchain, each block is a data structure that includes a payload of transactions, along with a header that contains the link to the previous block. (However, the link to the previous block may be omitted from the initial block, which may also be referred to as the "genesis block"). The block header may also include a hash value for the payload and a proof of work (POW), possibly along with other hash values or other types of data, such as a hash of the previous block.

Also, each transaction may be timestamped and digitally signed by the node which created it. For purposes of this disclosure, a node that creates a transaction for a distributed ledger may be referred to as a "transactor." A transaction may document a transfer of funds from an account of one transactor to an account of a second transactor, for example. After a transactor creates a transaction, the transactor may send the transaction to other nodes via the Internet, the "cloud," or any other suitable connection. A node called a "miner" may collect such transactions, validate them, and save them as part of a new block. The miner may then publish that new block to other nodes. For purposes of this disclosure, a node that creates a new block for a distributed ledger may also be referred to as a "validator." As described in greater detail below, validators may also validate new blocks from other validators.

The nodes which cooperate to maintain and build a particular distributed ledger may be referred to as a "distributed ledger system" (DLS). A DLS may maintain a blockchain without any central authority. Instead, the nodes may use processing resources to perform validation and other functions (e.g., generating POWs), and the nodes may cooperate to ensure universal or consensus agreement on the state of the ledger.

A distributed ledger may include all valid transactions that have ever been created. Accordingly, the distributed ledger may contain a set of blocks that is continuously growing. And each validator in a DLS may include a copy of the entire ledger. In addition, each validator may maintain local state data based on information from the transactions. For instance, each validator may keep a running total of all account balances, to be used for validating new transactions (e.g., to check for sufficient funds in an account to be debited by a new transaction).

Consequently, distributed ledgers have inherent scalability issues. When all of the validators in a DLS must have a copy of all transactions, all of the transactions must be broadcast to all of the validators. These broadcasted transactions create a very large number of network messages, on the order of (a) the number of validators in the DLS times (b) the number of transactions. Furthermore, at least one validator must then assemble a group of valid transactions into a block and broadcast that block to all other validators. Such broadcasted blocks also create a large number of network messages. And when each validator must permanently store all transactions, the DLS can impose significant storage requirements. Consequently, a DLS may not scale well due to factors such as the number of messages and the number of transactions.

The present disclosure describes methods and apparatus to facilitate secure partitioning and updating of distributed ledgers. A DLS that uses secure partitioning according to the present teachings may avoid some or all of the scaling issues experienced by other types of DLSs, with regard to the number of messages sent, and with regard to the number of transactions stored by a typical validator.

DESCRIPTION OF EMBODIMENTS

According to the present disclosure, to facilitate secure partitioning of a DLS, each node in the DLS uses trusted execution hardware to create a unique, unspoofable node identifier for itself. Those node identifiers are then used to securely assign nodes to validation groups. Each validation group handles a subset of the transaction processing and storage for the overall DLS. Consequently, the DLS avoids some or all of the scalability issues that would be faced by a monolithic, unpartitioned DLS.

Figure 1:
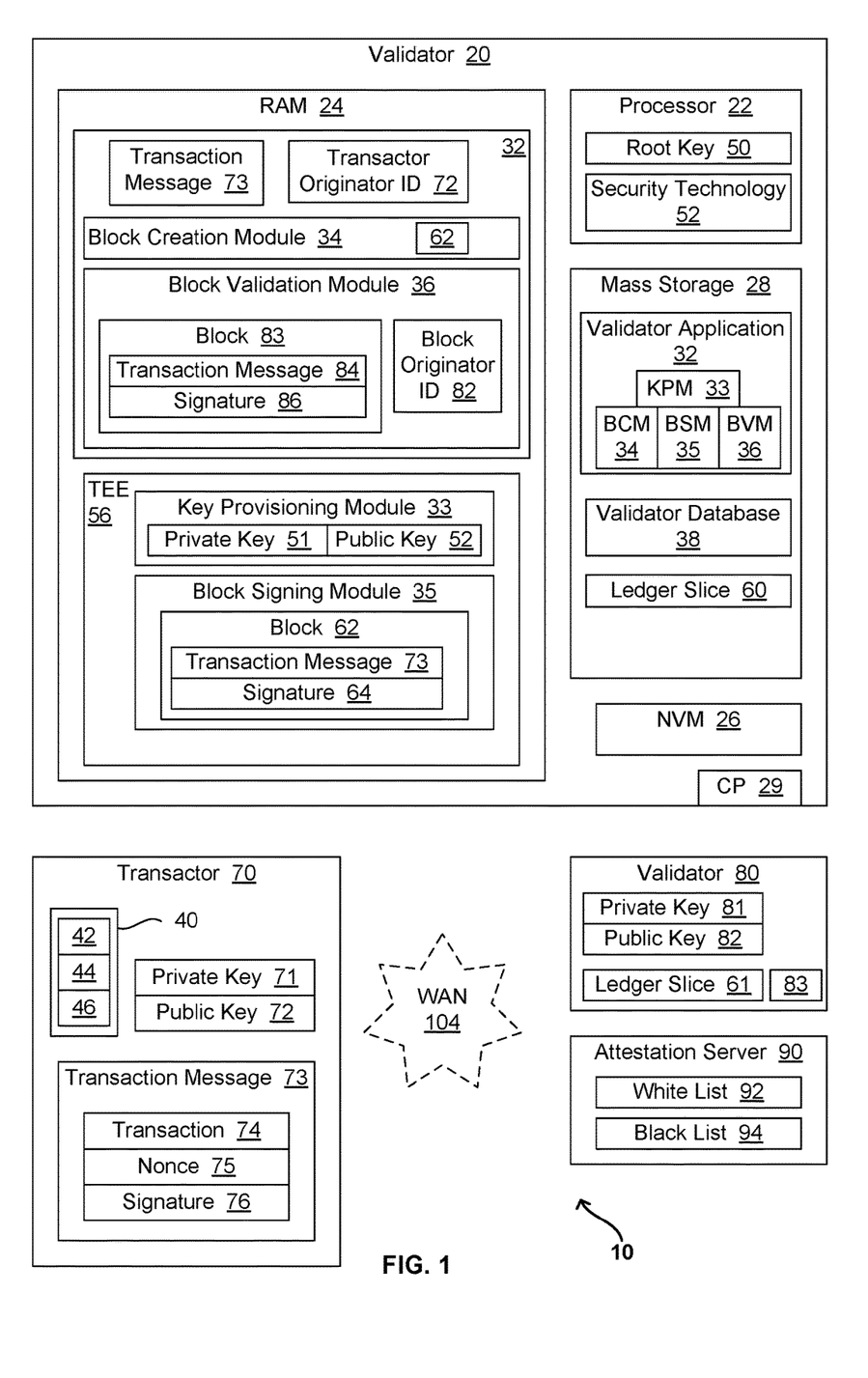
FIG. 1 is a block diagram of an example embodiment of a distributed computing system that provides for secure partitioning of a distributed ledger.

FIG. 1 is a block diagram of an example embodiment of a distributed computing system 10 that provides for secure partitioning of a distributed ledger. Distributed computing system 10 may also be referred to as DLS 10. As illustrated, DLS 10 includes at least one transaction node 70 and at least two validation nodes 20 and 80. For purposes of this disclosure, a transaction node may also be referred to as a "transactor," and a validation node may also be referred to as a "validator." Also, in at least one embodiment, one or more transactors may also operate as validators, and vice versa. In addition, DLS 10 includes an attestation server 90. The different devices in DLS 10 may communicate using any suitable approach or combination of approaches, including via a wide area network (WAN) 104 such as the Internet, via a local area network (LAN), etc.

In the embodiment of FIG. 1, the distributed ledger is a blockchain. However, in other embodiments, the present teaching may be used for other types of distributed ledgers.

In the embodiment of FIG. 1, each transactor and each validator includes trusted execution hardware for generating an unspoofable ID. For instance, validator 20 includes a processor 22 that includes a root key 50 and security technology 52 that prevents root key 50 from ever being exposed outside of processor 22. Root key 50 may be a fused key that is burned in to processor 22 during manufacturing, for instance.

Validator 20 also includes random access memory (RAM) 24 in communication with processor 22. Validator 20 may also include other components in communication with processor 22, such as mass storage 28, nonvolatile memory (NVM) 26, and at least one communication port (CP) 29. Validator 20 also includes a validator application 32 that validator 20 copies from mass storage 28 into RAM 24 for execution. In particular, as described in greater detail below, validator 20 may execute some parts of validator application 32 in a trusted execution environment (TEE) 56.

Security technology 52 in processor 22 enables processor 22 to establish TEE 56 in RAM 24. TEE 56 prevents processes or other execution entities outside of TEE 56 from accessing the information within TEE 56. For example, security technology 52 may include specialized instructions to create and utilize TEE 56. For instance, to create and utilize a TEE, a device may use the technology provided by Intel Corporation under the name or trademark "Intel Software Guard Extensions" or "Intel SGX," or the technology provided by ARM Ltd. under the name or trademark "ARM TrustZone." In the embodiment of FIG. 1, validator 20 protects the data in TEE 56 from being accessed or modified by any software or other components outside of TEE 56, including software operating at the OS level. TEE 56 thus provides an isolated execution environment. Thus, security technology 52 supports a TEE that prevents software outside of the TEE from accessing data in the TEE.

In addition, security technology 52 enables validator application 32 to use processor 22 to securely generate a public/private key pair, based on root key 50, without exposing root key 50. For instance, in one embodiment, to generate the key pair, validator application 32 may instruct a key provisioning module (KPM) 33 to execute a so-called "sgx_get_key" function in TEE 56, and that function may serve as a wrapper for a so-called "EGETKEY" instruction that executes in TEE 56. In one embodiment, when TEE 56 is created, security technology 52 in processor 22 may load the sgx_get_key function in TEE 56 as part of a trusted library. KPM 33 may then use the sgx_get_key function and the EGETKEY instruction to generate the key pair based on root key 50. And as described below, the public key from that key pair may then be used as a node identifier for validator 20. For purposes of this disclosure, such a node identifier may be referred to as an "originator identifier" or "originator ID."

The other nodes in DLS 10 (e.g., validator 80 and transactor 70) may also include the same kinds of components as validator 20, and each node may use its components to generate its own originator ID. As described in greater detail below, those originator IDs may then be used to partition the DLS into multiple different validation groups. Each validation group may then handle a subset of the transactions for DLS 10.

Accordingly, validator 20 includes a ledger slice 60 that contains the data from the blockchain that is associated with the nodes in the validation group for validator 20, and validator 80 includes a ledger slice 61 that contains the data from the blockchain that is associated with the nodes in the validation group for validator 80.

Figure 2:
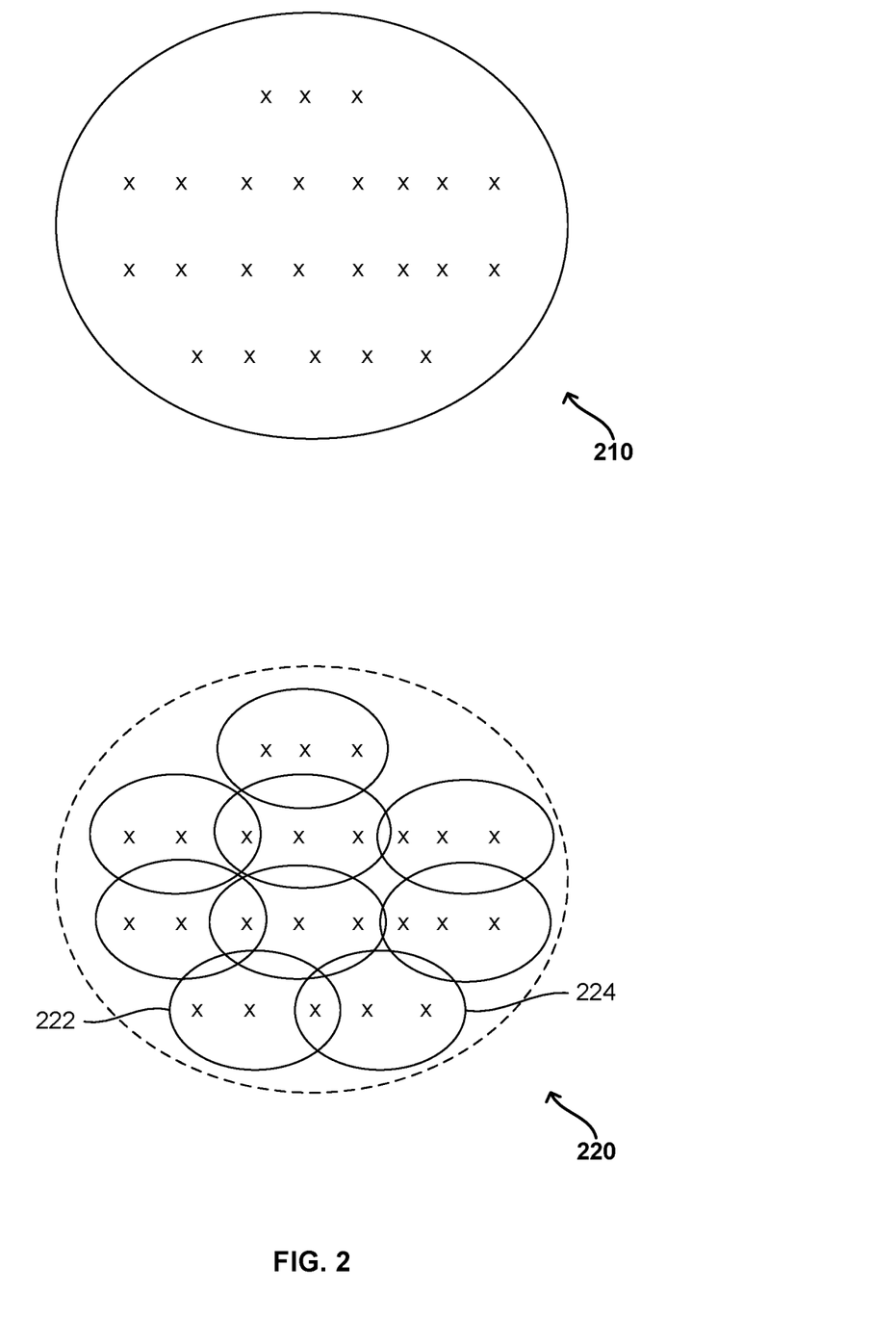
FIG. 2 presents two Venn diagrams illustrating differences between an unpartitioned DLS and a partitioned DLS.

FIG. 2 presents two Venn diagrams illustrating differences between an unpartitioned DLS 210 and a partitioned DLS 220. The x's in FIG. 2 represent transactions from different transactors.

In unpartitioned DLS 210, each transaction is sent to each validator. Accordingly, DLS 210 is shown with a single circle encompassing all of the transactions, to indicate that each validator is basically responsible for every transaction. Additionally, when a validator creates new block, the validator must broadcast the new block to all other validators. Consequently, the number of messages sent may grow very large as the number of nodes in the system increases.

By contrast, partitioned DLS 220 depicts numerous smaller circles, each of which corresponds to a different validation group, such as validation group 222 and validation group 224. The circle for each validation group encompasses only a subset of the transactions, to illustrate that each validation group is only responsible for that subset of transactions. Consequently, partitioned DLS 220 allows for parallel processing of transactions. Moreover, scaling concerns are reduced or eliminated, because the processing and communication requirements are bounded in size based on (a) the number of validators per group times (b) only the transactions that belong to that group.

For example, as described in greater detail below, when a validator in partitioned DLS 220 receives a transaction from a transactor, the validator may use the originator ID for that transactor to determine whether that transactor is in the same validator group as the validator. In other words, the validator may use the originator ID for the transaction to determine whether the transactor belongs to the validator. If the transactor is in the same validator group as the validator, the validator may process the transaction (e.g., be validating it and, upon successful validation, adding it to a new block). If the transactor is not in the same validator group as the validator, the validator may forward or broadcast the transaction to one or more other validators In addition, as illustrated, the validation groups in partitioned DLS 220 may overlap to a certain degree. For example, validation group 222 and validation group 224 may both process transactions from a certain transactor, as illustrated by the overlap around the central x at the bottom of partitioned DLS 220. And when a validator creates a new block, the validator may only need to send that block to the other validators in the same group. However, in at least one embodiment, the number of validators in each group is bounded. Consequently, the number of messages sent among group members remains bounded even as other validators join the network. The overall number of groups may change when new validators join the DLS, but a change to the number of groups may have little or no impact on the number of messages sent within each group.

In one example scenario, partitioned DLS 220 in FIG. 2 represents or corresponds to DLS 10 from FIG. 1.

In brief, when a transactor wishes to send a transaction into the network, the transactor may send the transaction to any validator as an entry point. That validator may then use the originator ID for the transaction to determine the appropriate validation group for that transaction. For instance, all of the validators may be configured to use validation groups of a predetermined size "K", and the receiving validator may compute the K closest validators for the transaction, based on the originator ID for the transaction and the originator IDs for all of the validators. In other words, the validator may determine the corresponding K nearest neighbor group of validators based on closeness, where K is a parameter for the number of validators per group. Also, K may be configurable, based on redundancy and efficiency considerations. After determining the appropriate validation group for the transaction, the validator may then broadcast the transaction to that group, for processing by those group members only.

Figure 3:
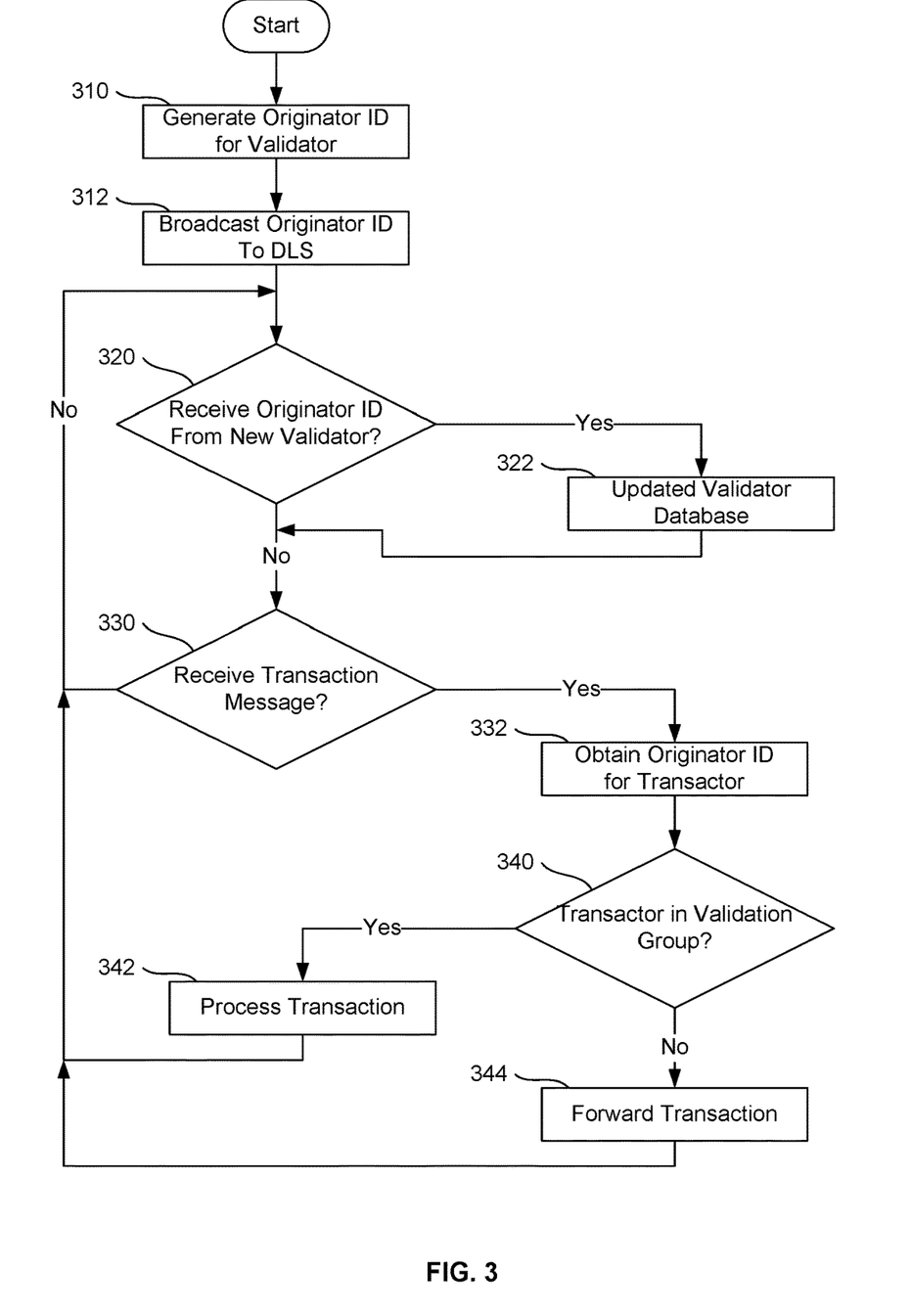
FIG. 3 presents a flowchart of an example process for a validator in a partitioned DLS to process transactions from transactors.

FIG. 3 presents a flowchart of an example process for a validator in a partitioned DLS to process transactions from transactors. For purposes of illustration, that process is described as being performed by validator 20. In particular, the illustrated operations may be performed by validator application 32. Moreover, validator application 32 may include various different modules, programs, subroutines, and such for performing certain functions, including KPM 33, a block creation module (BCM) 34, a block signing module (BSM) 35, and a block validation module (BVM) 36.

The process of FIG. 3 may begin with validator application 32 performing one or more setup operations. In particular, as shown at block 310, the setup operations include using KPM 33 to generate an originator ID for validator 20. Specifically, validator application 32 launches KPM 33 in a secure enclave in TEE 56, and KPM 33 then uses a secure execution entity (such as an instruction or microcode) from processor 22 to generate a key pair based on root key 50. That key pair may include private key 51 and public key 52. Since private key 51 is protected by TEE 56, private key 51 may also be referred to as secure private key (SPK) 51. In addition, validator application 32 may use public key 52 as the originator ID for validator 20.

As shown at block 312, validator application 32 may then broadcast the originator ID for validator 20 to some or all of the other nodes in DLS 10, to enable the other nodes to account for validator 20 when determining the composition of validation groups. When validator application 32 sends the originator ID, it may also include the network address for validator 20. As shown at block 320, validator application 32 may then determine whether validator 20 has received any originator IDs and network addresses from any new validators. If so, validator application 32 may update a validator database 38 in validator 20 to include the originator IDs and network addresses for any new validators.

As shown at block 330, validator application 32 may then determine whether validator 20 has received a transaction record from another node. For purposes of this disclosure, a transaction record may also be referred to as a "transaction message." If no transaction message has been received, the process may return to block 320, with validator application 32 waiting to receive an originator ID or a transaction message from another node, as indicated above. If validator 20 has received a transaction message, validator application 32 may obtain the originator ID for the transactor that created the transaction message, as shown at block 332. For purposes of this disclosure, an originator ID for a transactor that created a transaction message may be referred to as a "transaction originator ID." FIG. 1 shows validator application 32 obtaining the transaction originator ID 72 for a transaction message 73 that was generated by transactor 70.

In one embodiment, a transactor may include its originator ID as part of the transaction message.

In another embodiment, the transactor may include data in the transaction message from which other nodes will derive the transaction originator ID. For instance, in the embodiment of FIG. 1, transactor 70 includes a transactor application 40 with a KPM 42, a transaction message creation module (TMCM) 44, and a transaction message signing module (TMSM) 46. As a setup operation, transactor application 40 uses KPM 42 to generate a key pair that includes private key 71 and public key 72, based on a root key in a processor of transactor 70, using a process like the one described in greater detail above with regard to validator 20. Public key 72 may then serve as the originator ID 72 for transactor 70. Transactor application 40 then uses TMCM 44 to create a transaction message 73 with a transaction 74, a nonce 75, and a signature 76. In particular, TMCM 44 uses TMSM 46 to generate the digital signature 76 for transaction message 73, and TMSM 46 uses an algorithm that accepts transaction 74, nonce 75, and private key 71 as input, and that generates signature 76 as output. In particular, the algorithm is designed to allow other nodes to derive public key 72, based on signature 76. For instance, the algorithm may be an elliptic curve digital signature algorithm (ECDSA) Like KPM 33 and BSM 35, KPM 42 and TMSM 46 may operate in secure enclaves in a TEE.

Referring again to FIG. 3, after validator application 32 obtains the originator ID for the transactor that created the transaction message, validator application 32 may use that transaction originator ID to determine whether that transactor is in the same validation group as validator 20, as shown at block 340. If the transactor is not in the same validation group as validator 20, validator application 32 may forward the transaction to one or more other validators, as shown at block 344. If the transactor is in the same validation group as validator 20, validator application 32 may process the transaction, as shown at block 342.

For instance, when validator 20 receives transaction message 73 from transactor 70, validator application 32 may validate transaction message 73. For instance, validator application 32 may use signature 76 to verify the integrity of transaction message 73, and validator application 32 may use account balances from ledger slice 60 to verify that any accounts to be debited by transaction 74 have sufficient funds.

Upon successful validation, validator application 32 may use BCM 34 to create a new block 62 to include transaction message 73 (possibly along with additional transaction messages), as illustrated in FIG. 1. And BCM 34 may execute BSM 35 in a secure enclave in TEE 56, to generate a digital signature 64 for block 62, based on private key 51. Like TMSM 46, BSM 35 may allow other nodes to derive the originator ID for validator 20 (i.e., public key 52), based on signature 64. For instance, BSM 35 may use an ECDSA to generate signature 64. As part of the signing process, BSM 35 may also include version information for itself and a hash of itself as part of the block signature or somewhere else in the block header. For instance, BSM 35 may use a secure signing function from security technology 52 that automatically returns such information when BSM 35 generates the block signature. Accordingly, the signature data that BSM 35 returns to BCM 34 may include version information and hash information for BSM 35 appended near the signature block. Validator application 32 may then broadcast block 62 to other validators in DLS 10, for inclusion in the blockchain. Subsequently, when other validators attempt to validate block from validator 20, those other validators may check to make sure that the hash and version information is acceptable. To enable this kind of validation, the validation node may be provided in advance with the expected hash and version information for at least one trustworthy BSM.

The other validators may also verify the signature itself, etc., as described in greater detail below.

Figure 4:
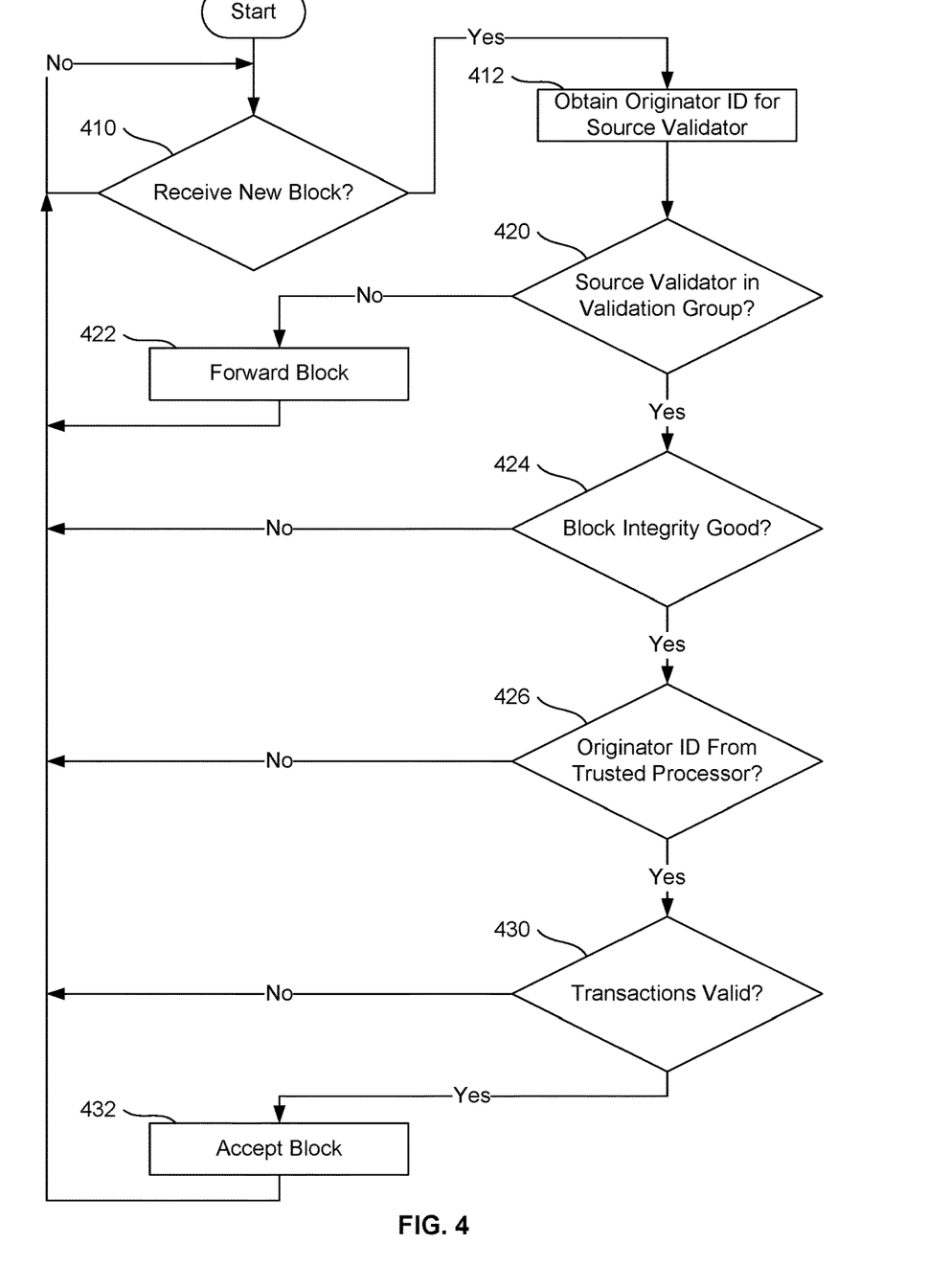
FIG. 4 presents a flowchart of an example process for a validator in a partitioned DLS to process blocks from other validators.

FIG. 4 presents a flowchart of an example process for a validator in a partitioned DLS to process blocks from other validators. For purposes of illustration, FIG. 4 is described in the context of validator 20 receiving a new block 83 from validator 80. Additionally, when validator 80 created block 83, validator 80 used a private key 81 that is based on a root key in a processor of validator 80, as described above with regard to validator 20. In particular, private key 81 is part of a key pair that also includes public key 82, and public key 82 serves as the originator ID for validator 80.

The process of FIG. 4 begins with validator 20 waiting to receive a new block from another validator, as shown at block 410. This operation may happen after validator 20 has generated an originator ID for itself and established a validator database, as described above with regard to FIG. 3. Once validator 20 receives a new block, the process may pass to block 412, which shows validator application 32 obtaining the originator ID for the validator that created the new block. For purposes of this disclosure, an originator ID for a validator that created a block may be referred to as a "block originator ID." In one embodiment, a validator may include its originator ID as part of the block. In another embodiment, the validator may include data in the block from which other nodes will derive the block originator ID.

As indicated above, in an example scenario, validator application 32 receives block 63 from validator 80. And as illustrated in FIG. 1, block 63 includes at least one transaction message 84, along with a signature 86 from validator 80. At block 412 of FIG. 4, validator application 32 may use BVM 36 to obtain the block originator ID 82 for block 83. For instance, BVM 36 may derive block originator ID 82 based on signature 86, the payload of block 83 (e.g., transaction message 84), and a predetermined ECDSA.

As shown at block 420, BVM 36 may then use block originator ID 82 to determine whether the validator that created block 83 shares a validation group with validator 20.

Any suitable technique may be used to define validation groups. For instance, in one embodiment, the validation group for any validator is determined by a closeness function that evaluates how close (a) a given originator ID is to (b) the originator ID of that validator. Closeness may refer, for example, to numerical closeness. Thus, the closeness function may define a validation group as including a predetermined number "K" of the originator IDs that are closest to the originator ID of the node evaluating closeness. In other words, the closeness function may determine the K nearest neighbor validators and transactors, based on the ID of the validators relative to the ID on the transaction message or block under consideration. For example, to process block 83, BVM 36 may XOR block originator ID 82 with each of the originator IDs in validator database 38. Then, BVM 36 may sort the results and select the lowest K of them as belonging in the validation group for validator 20. Accordingly, as indicated above with regard to FIG. 2, a validator may be in multiple validation groups.

As shown at block 422, if a block came from a validator that does not share a validation group with validator 20, validator application 32 may forward that application to one or more other validators. However, if the block came from a validator that is in a validation group with validator 20, validator application 32 may then process that block.

For instance, as shown at block 424, validator application 32 may compute a hash of the payload of block 83, and validator application 32 may compare that result with a hash in signature 86 to determine whether the payload has been tampered with or if it is clean. And if it is clean, validator application 32 may send a query with block originator ID 82 to attestation server 90 to determine whether the node that created block 83 should be trusted, as shown at block 426. In one embodiment, attestation server 90 includes a white list 92 of known good originator IDs and a black list 94 of known bad originator IDs, where a known good originator ID is an originator ID for a trusted processor, and known bad originator ID is an originator ID for a processor that is suspected of being (or known to be) untrustworthy. In other embodiments, attestation servers may use different techniques to determine whether a given originator ID is associated with a trusted processor.

In at least one embodiment, the attestation server reflects information provided by the manufacturer of processors in the nodes of the distributed ledger. That information enables the attestation server to recognize trusted processors. In particular, that information enables the attestation server to respond to queries about node identifiers such as originator IDs by indicating whether a given node identifier belongs to a node with a processor that has the following features: (a) support for a TEE that prevents software outside of the TEE from accessing data in the TEE; (b) technology to generate at least one SPK based on a root key in the processor; and (c) technology to prevent the root key from ever being exposed, even inside the TEE. In other words, attestation server indicates whether the given node identifier belongs to a node with a trusted processor.

Referring again to FIG. 4, if the block is clean and if it came from a validator with a trusted processor, validator application 32 may determine whether the transactions in the block are valid, as shown at block 430. If the transactions are valid, validator application 32 may then accept the new block as part of the distributed ledger, as shown at block 432. Otherwise, validator application 32 may reject the new block. The process may then return to block 410 (or to block 320 of FIG. 3), with validator application 32 processing additional transactions, blocks, etc. as indicated above.

Thus, as has been described, validator application 32 may determine whether a source node has trusted execution hardware, and validator application 32 may rely on that trusted execution hardware (along with other safeguards) to prevent the source node from manipulating validation group membership by forging an identity. Malicious validators may therefore be prevented from colluding to take over a single validation group. For example, security technology 52 may cause processor 22 to generate the same key pair every time validator application 32 requests a key pair from processor 22. Accordingly, each node may have only one originator ID per processor, and any attempt to launch multiple instances on a single node with a single processor will result in the same originator ID for each instance. Also, according to the present disclosure, nodes use trusted execution hardware to generate originator IDs in secure enclaves. Thus, in at least one embodiment, the trusted execution hardware ensures that each validation node and each transaction node obtains an originator ID that is deterministic, unique, unspoofable, and unalterable. Furthermore, validator application 32 may use the signature on the block to verify that the source node used the private key associated with that originator ID to sign the block. Validator 20 may therefore trust that the originator ID of the source node has not been forged. For similar reasons, security technology 52 may prevent a node from launching multiple identities. Security technology 52 may thus prevent so-called Sybil attacks. Similarly, security technology 52 may prevent a node from copying or spoofing the identity from another node.

Additionally, the technology described herein may decrease the number of transactions that each validator must store. Rather than being required to store all transactions, each validator may store only those transactions associated with the nodes in the validation group for that validator.

The present technology may also provide a distributed ledger that is immune to more types of attacks than other kinds of distributed ledgers. For example, a distributed ledger that is partitioned according to a distributed hash table based on network addresses may be subject to a Sybil attack where a node creates several identities for itself and then uses whatever identity provides the most strategic position at the time. By contrast, according to the present disclosure, partitioning may be based on originator IDs, and the originator ID for each node may be independent of the network address for that node.

In one embodiment, the set of originator IDs across all nodes in the system forms a roughly uniform distribution. For instance, when generating originator IDs, KPMs may select substantially random elements from the group of points on a predetermined elliptic curve. And as indicated above, the originator ID for each transaction or block controls which transactions or blocks should be processed and stored by which validators, based on the closeness of the originator ID for the block or transaction to the validator's originator ID. The degree of closeness could be determined by a bit-wise XOR of the originator ID of the source node with the originator ID of the validator. Alternatively, a similar deterministic calculation may be used to determine closeness based on the originator ID values.

Validators may commit transactions to the distributed ledger by grouping received transactions into blocks. In one embodiment, one validator in the validation group may be selected as the leader, and whenever the leader generates a new block, the leader may broadcast that block to all other validators in the validation group. Those validators may then examine the transactions inside the block and either approve or reject the block, based on the validity of the transactions, as indicated above.

In order to determine the validity of the transactions in the block, the validators may keep the history of all dependent transactions for that transaction. Those dependent transactions may be determined, at least in part, by originator ID. For instance, all of the validators in the validation group may keep a history of all of the transactions from all of the transactors in that validation group, to expedite transaction validation. By contrast, for a system with a monolithic distributed ledger, each validator might be required to keep every transaction for the entire ledger in order to perform validation. The present teachings, by contrast, allow each validator to store only a subset of the transactions. Therefore, validators may assemble transaction blocks more easily, and validators may more quickly validated blocks from other validators, which may store similar subsets of the transactions.

Each validator may also be configured with a predetermined parameter to indicate how many validators must approve a block. This parameter may be referred to as a consensus threshold, and consensus threshold may be less than the validation group parameter K. Consequently, a subset of validators may quickly validate a block of transactions. And the uniform distribution of originator ID may ensure that all transactions are covered by a corresponding set of validators.

Another security risk faced by distributed ledgers that are partitioned involves malicious or compromised validators in a network, which may attempt to collude by co-locating themselves in the network. If a DLS allows validators to select or brute-force their originator IDs, it is possible that the malicious validators may take over a particular partition and then either ignore legitimate transactions or inject faulty transactions into blocks. And if enough validators were to collude over a particular space, this could inject faulty transactions into the ledger, or it could block valid transactions from particular transactors. However, distributed systems may be designed to prevent such attacks. In other words, they may be designed to be practically Byzantine fault tolerant (PBFT). For instance, some designs can tolerate up to one third of the nodes being malicious. However, when transactors are unable to control the values of their originator IDs, malicious transactors may find it difficult or impossible to target or overcome any particular validation group.

Additionally, due to the trusted hardware described herein, a malicious validator cannot launch multiple identities. The trusted hardware thus prevents a single malicious system from launching multiple validators and thereby taking over a large portion of the network from a single machine. The trusted hardware may allow only a single originator ID per machine. Consequently, if an attacker were to launch multiple instances of a validator, each instance would have the same originator ID and would therefore not be useful.

A transactor might also attempt to spoof its originator ID, to direct its transactions to known sets of malicious validators. However, the present teachings prevent each transactor from controlling the value of its originator ID. And the present teachings define validation groups based on originator ID. The present teachings therefore prevent transactors from targeting transactions to specific validators. Additionally, since the trusted hardware only allows one originator ID per transactor, a transactor cannot launch a Sybil attack where the transactor changes identity based on where the transactor wants its transaction to be processed.

In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. And software that is used during the boot process may be referred to as firmware. Software that is stored in non-volatile memory may also be referred to as firmware. In addition, terms like "program" and "module" may be used in general to cover a broad range of software constructs, including applications, routines, drivers, subprograms, processes, and other types of software components. Any suitable operating environment and programming language (or combination of operating environments and programming languages) may be used to implement software components described herein.

Alternative embodiments include machine accessible media encoding instructions or control logic for performing the operations described herein. Such embodiments may also be referred to as program products. Such machine accessible media may include, without limitation, tangible storage media such as magnetic disks, optical disks, RAM, read-only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as part of an integrated circuit chip, a programmable gate array (PGA), an application-specific integrated circuit (ASIC), etc.).

In at least one embodiment, the instructions for all relevant components may be stored in one non-transitory machine accessible medium. In at least one other embodiment, two or more non-transitory machine accessible media may be used for storing the instructions for the relevant components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines. Similarly, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

The present teachings may be used to advantage in many different kinds of data processing systems. Example data processing systems may include, without limitation, systems on a chip (SOCs), wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a device with technology to verify a block record for a digital ledger that is distributed and partitioned. The device comprises at least one processor, non-volatile storage responsive to the processor, and instructions in the non-volatile storage. When the instructions are executed by the processor, the instructions enable the device to operate as a first validation node by performing various operations. Those operations comprise (a) receiving a block record from a second validation node, wherein the block record comprises a digital signature for the block record, and (b) in response to receiving the block record, automatically obtaining a node identifier for the second validation node, based on the digital signature for the block record. Those operations further comprises (a) using the node identifier for the second validation node to determine whether the second validation node belongs to a validation group that comprises the first validation node, (b) using an attestation service of a remote attestation node to determine whether the node identifier for the second validation node belongs to a node with a trusted processor, and (c) using the digital signature for the block record to determine whether the digital signature was created with a private key that corresponds to the node identifier for the second validation node. In addition, those operations comprises accepting the block record as valid only if the first validation node determines that (a) the second validation node belongs to a validation group that comprises the first validation node, (b) the node identifier for the second validation node belongs to a node with a trusted processor, and (c) the digital signature for the block record was created with a private key that corresponds to the node identifier for the second validation node.

Example A2 is a device according to Example A1, wherein the operation of using the attestation service to determine whether the node identifier for the second validation node belongs to a node with a trusted processor comprises using the attestation service to determine whether the node identifier for the second validation node belongs to a node with a processor that has features comprising (a) support for a trusted execution environment (TEE) that prevents software outside of the TEE from accessing data in the TEE, (b) technology to generate at least one secure private key (SPK) based on a root key in the processor, and (c) technology to prevent the root key from ever being exposed outside of the processor.

Example A3 is a device according to Example A1, wherein the operation of using the digital signature for the block record to determine whether the digital signature was created with a private key that corresponds to the node identifier for the second validation node comprises using the node identifier for the second validation node as a public key for the second validation node, and verifying that the digital signature for the block record was signed with a private key that corresponds to the public key for the second validation node. Example A3 may also include the features of Example A2.

Example A4 is a device according to Example A1, wherein the operations further comprise (a) at the first validation node, receiving a transaction record from a transaction node, wherein the transaction record comprises a digital signature for the transaction record; (b) in response to receiving the transaction record, automatically obtaining a node identifier for the transaction node, based on the digital signature for the transaction record; and (c) using the node identifier for the transaction node to determine whether the transaction node belongs to the validation group that comprises the first validation node. Example A4 may also include the features of any one or more of Examples A2 through A3.

Example A5 is a device according to Example A4, wherein the operations further comprise, in response to a determination that the transaction node does not belong to the validation group that comprises the first validation node, automatically forwarding the transaction record to another validation node.

Example A6 is a device according to Example A4, wherein the operations further comprise (a) in response to a determination that the transaction node belongs to the validation group that comprises the first validation node, automatically validating the transaction record; and (b) in response to successful validation of the transaction record, adding the transaction record to a new block record. Example A6 may also include the features of Example A5.

Example A7 is a device according to Example A6, wherein the operations further comprise (a) generating a secure private key (SPK) for the first validation node, based on a root key in the processor of the first validation node; and (b) in response to successful validation of the transaction record, using (i) the SPK and (ii) an elliptic curve digital signature algorithm (ECDSA) to generate a digital signature for the new block.

Example A8 is a device according to Example A7, wherein the operation of generating the SPK for the first validation node comprises generating the SPK in a trusted execution environment (TEE) in the first validation node, wherein the TEE prevents software outside of the TEE from accessing data in the TEE.

Example A9 is a device according to Example A7, wherein the operation of using (i) the SPK and (ii) the ECDSA to generate the digital signature for the new block comprises using the SPK to generate the digital signature for the new block in a trusted execution environment (TEE) in the first validation node, wherein the TEE prevents software outside of the TEE from accessing data in the TEE. Example A9 may also include the features of Example A8.

Example A10 is a device according to Example A7, (a) wherein the operations further comprise generating a node identifier for the first validation node, and (b) wherein the operation of generating the SPK for the first validation node comprises generating the node identifier for the first validation node as a public key counterpart for the SPK. Example A10 may also include the features of any one or more of Examples A8 through A9.

Example A11 is a device according to Example A10, wherein the digital signature for the new block enables other nodes to determine the node identifier for the first validation node.

Example A12 is a distributed ledger system (DLS) according to Example A1, wherein the DLS comprises (a) the first validation node according to claim 1; (b) the second validation node according to claim 1; and (c) a transaction node. Example A12 may also include the features of any one or more of Examples A2 through A10.

Example A13 is a DLS according to Example A12, wherein the DLS further comprises the attestation node according to claim 1.

Example B1 is an apparatus to support verification of a block record for a digital ledger that is distributed and partitioned. The apparatus comprises at least one non-transitory machine-accessible storage medium and instructions in the machine-accessible storage medium. The instructions, when executed by a device, enable the device to operate as a first validation node. In particular, the instructions enable the device to perform operations comprising (a) receiving a block record from a second validation node, wherein the block record comprises a digital signature for the block record; (b) in response to receiving the block record, automatically obtaining a node identifier for the second validation node, based on the digital signature for the block record; (c) using the node identifier for the second validation node to determine whether the second validation node belongs to a validation group that comprises the first validation node; (d) using an attestation service of a remote attestation node to determine whether the node identifier for the second validation node belongs to a node with a trusted processor; and (e) using the digital signature for the block record to determine whether the digital signature was created with a private key that corresponds to the node identifier for the second validation node. The instructions also enable the device to accept the block record as valid only if the first validation node determines that (a) the second validation node belongs to a validation group that comprises the first validation node, (b) the node identifier for the second validation node belongs to a node with a trusted processor, and (c) the digital signature for the block record was created with a private key that corresponds to the node identifier for the second validation node.

Example B2 is an apparatus according to Example B1, wherein the operation of using the attestation service to determine whether the node identifier for the second validation node belongs to a node with a trusted processor comprises using the attestation service to determine whether the node identifier for the second validation node belongs to a node with a processor that has features comprising (a) support for a trusted execution environment (TEE) that prevents software outside of the TEE from accessing data in the TEE, (b) technology to generate at least one secure private key (SPK) based on a root key in the processor, and (c) technology to prevent the root key from ever being exposed outside of the processor.

Example B3 is an apparatus according to Example B1, wherein the operation of using the digital signature for the block record to determine whether the digital signature was created with a private key that corresponds to the node identifier for the second validation node comprises using the node identifier for the second validation node as a public key for the second validation node, and verifying that the digital signature for the block record was signed with a private key that corresponds to the public key for the second validation node. Example B3 may also include the features of Example B2.

Example B4 is an apparatus according to Example B1, wherein the operations further comprise (a) at the first validation node, receiving a transaction record from a transaction node, wherein the transaction record comprises a digital signature for the transaction record; (b) in response to receiving the transaction record, automatically obtaining a node identifier for the transaction node, based on the digital signature for the transaction record; and (c) using the node identifier for the transaction node to determine whether the transaction node belongs to the validation group that comprises the first validation node. Example B4 may also include the features of any one or more of Examples B2 through B3.

Example B5 is an apparatus according to Example B4, wherein the operations further comprise, in response to a determination that the transaction node does not belong to the validation group that comprises the first validation node, automatically forwarding the transaction record to another validation node.

Example B6 is an apparatus according to Example B4, wherein the operations further comprise (a) in response to a determination that the transaction node belongs to the validation group that comprises the first validation node, automatically validating the transaction record; and (b) in response to successful validation of the transaction record, adding the transaction record to a new block record. Example B7 may also include the features of Example B6.

Example B7 is an apparatus according to Example B6, wherein the operations further comprise (a) generating a secure private key (SPK) for the first validation node, based on a root key in a processor of the first validation node; and (b) in response to successful validation of the transaction record, using (i) the SPK and (ii) an elliptic curve digital signature algorithm (ECDSA) to generate a digital signature for the new block.

Example B8 is an apparatus according to Example B7, wherein the operation of generating the SPK for the first validation node comprises generating the SPK in a trusted execution environment (TEE) in the first validation node, wherein the TEE prevents software outside of the TEE from accessing data in the TEE.

Example B9 is an apparatus according to Example B7, wherein the operation of using (i) the SPK and (ii) the ECDSA to generate the digital signature for the new block comprises using the SPK to generate the digital signature for the new block in a trusted execution environment (TEE) in the first validation node, wherein the TEE prevents software outside of the TEE from accessing data in the TEE. Example B9 may also include the features of Example B8.

Example B10 is an apparatus according to Example B7, (a) wherein the operations further comprise generating a node identifier for the first validation node, and (b) wherein the operation of generating the SPK for the first validation node comprises generating the node identifier for the first validation node as a public key counterpart for the SPK. Example B10 may also include the features of any one or more of Examples B8 through B9.

Example B11 is an apparatus according to Example B10, wherein the digital signature for the new block enables other nodes to determine the node identifier for the first validation node.

Example C1 is an automated method to verify a block record for a digital ledger that is distributed and partitioned. The method comprises (a) at a first validation node, receiving a block record from a second validation node, wherein the block record comprises a digital signature for the block record; (b) in response to receiving the block record, automatically obtaining a node identifier for the second validation node, based on the digital signature for the block record; (c) using the node identifier for the second validation node to determine whether the second validation node belongs to a validation group that comprises the first validation node; (d) using an attestation service of a remote attestation node to determine whether the node identifier for the second validation node belongs to a node with a trusted processor; and (e) using the digital signature for the block record to determine whether the digital signature was created with a private key that corresponds to the node identifier for the second validation node.

Example C2 is a method according to Example C1, further comprising accepting the block record as valid only if the first validation node determines that (a) the second validation node belongs to a validation group that comprises the first validation node, (b) the node identifier for the second validation node belongs to a node with a trusted processor, and (c) the digital signature for the block record was created with a private key that corresponds to the node identifier for the second validation node.

Example C3 is a method according to Example C1, wherein the operation of using the attestation service to determine whether the node identifier for the second validation node belongs to a node with a trusted processor comprises using the attestation service to determine whether the node identifier for the second validation node belongs to a node with a processor that has features comprising (a) support for a trusted execution environment (TEE) that prevents software outside of the TEE from accessing data in the TEE, (b) technology to generate at least one secure private key (SPK) based on a root key in the processor, and (c) technology to prevent the root key from ever being exposed outside of the processor. Example C3 may also include the features of Example C2.

Example C4 is a method according to Example C1, wherein the operation of using the digital signature for the block record to determine whether the digital signature was created with a private key that corresponds to the node identifier for the second validation node comprises using the node identifier for the second validation node as a public key for the second validation node, and verifying that the digital signature for the block record was signed with a private key that corresponds to the public key for the second validation node. Example C4 may also include the features of any one or more of Examples C2 through C3.

Example C5 is a method according to Example C1, further comprising (a) at the first validation node, receiving a transaction record from a transaction node, wherein the transaction record comprises a digital signature for the transaction record; (b) in response to receiving the transaction record, automatically obtaining a node identifier for the transaction node, based on the digital signature for the transaction record; and (c) using the node identifier for the transaction node to determine whether the transaction node belongs to the validation group that comprises the first validation node. Example C5 may also include the features of any one or more of Examples C2 through C4.

Example C6 is a method according to Example C5, further comprising, in response to a determination that the transaction node does not belong to the validation group that comprises the first validation node, automatically forwarding the transaction record to another validation node.

Example C7 is a method according to Example C5, further comprising: (a) in response to a determination that the transaction node belongs to the validation group that comprises the first validation node, automatically validating the transaction record; and (b) in response to successful validation of the transaction record, adding the transaction record to a new block record. Example C7 may also include the features of Example C6.

Example C8 is a method according to Example C7, further comprising (a) generating a secure private key (SPK) for the first validation node, based on a root key in a processor of the first validation node; and (b) in response to successful validation of the transaction record, using (i) the SPK and (ii) an elliptic curve digital signature algorithm (ECDSA) to generate a digital signature for the new block.

Example C9 is a method according to Example C8, wherein the operation of generating the SPK for the first validation node comprises generating the SPK in a trusted execution environment (TEE) in the first validation node, wherein the TEE prevents software outside of the TEE from accessing data in the TEE.

Example C10 is a method according to Example C8, wherein the operation of using (i) the SPK and (ii) the ECDSA to generate the digital signature for the new block comprises using the SPK to generate the digital signature for the new block in a trusted execution environment (TEE) in the first validation node, wherein the TEE prevents software outside of the TEE from accessing data in the TEE. Example C10 may also include the features of Example C9.

Example C11 is a method according to Example C8, (a) further comprising generating a node identifier for the first validation node, and (b) wherein the operation of generating the SPK for the first validation node comprises generating the node identifier for the first validation node as a public key counterpart for the SPK. Example C11 may also include the features of any one or more of Examples C9 through C10.

Example C12 is a method according to Example C11, wherein the digital signature for the new block enables other nodes to determine the node identifier for the first validation node.

Example D is at least one machine-accessible medium comprising computer instructions to verify a block record for a digital ledger that is distributed and partitioned, wherein the computer instructions, in response to being executed in a device, enable the device to perform a method according to any of Examples C1 through C12.

Example E is a data processing system with technology to verify a block record for a digital ledger that is distributed and partitioned. The data processing system comprises (a) a processing element; (b) at least one machine-accessible medium responsive to the processing element; and (c) computer instructions stored at least partially in the at least one machine-accessible medium. The computer instructions, in response to being executed, enable the data processing system to perform a method according to any of Examples C1 through C12.

Example F is a data processing system with technology to verify a block record for a digital ledger that is distributed and partitioned. The data processing system comprises means for performing the method according to any of Examples C1 through C12.

What is claimed is:

1. A device with technology to verify a block record for a digital ledger that is distributed and partitioned, the device comprising:

at least one processor;

non-volatile storage responsive to the processor; and instructions in the non-volatile storage which, when executed by the processor, enable the device to operate as a first validation node by performing operations comprising:

receiving a block record of a distributed digital ledger from a second validation node, wherein the block record comprises a payload of transactions, a header with a link to a previous block, and a digital signature for the block record;

in response to receiving the block record, automatically obtaining a node identifier for the second validation node, based on the digital signature for the block record;

using the node identifier for the second validation node to determine whether the second validation node belongs to a validation group that comprises the first validation node wherein the validation group comprises a plurality of validation nodes to validate a ledger slice partitioned from the distributed digital ledger;

using an attestation service of a remote attestation node to determine whether the node identifier for the second validation node belongs to a node with a trusted processor;

using the digital signature for the block record to determine whether the digital signature was created with a private key that corresponds to the node identifier for the second validation node; and accepting the block record as valid only if the first validation node determines that (a) the second validation node belongs to a validation group that comprises the first validation node, (b) the node identifier for the second validation node belongs to a node with a trusted processor, and (c) the digital signature for the block record was created with a private key that corresponds to the node identifier for the second validation node.

2. A device according to claim 1, wherein the operation of using the attestation service to determine whether the node identifier for the second validation node belongs to a node with a trusted processor comprises:

using the attestation service to determine whether the node identifier for the second validation node belongs to a node with a processor that has features comprising (a) support for a trusted execution environment (TEE) that prevents software outside of the TEE from accessing data in the TEE, (b) technology to generate at least one secure private key (SPK) based on a root key in the processor, and (c) technology to prevent the root key from ever being exposed outside of the processor.

3. A device according to claim 1, wherein the operation of using the digital signature for the block record to determine whether the digital signature was created with a private key that corresponds to the node identifier for the second validation node comprises:

using the node identifier for the second validation node as a public key for the second validation node, and verifying that the digital signature for the block record was signed with a private key that corresponds to the public key for the second validation node.

4. A device according to claim 1, wherein the operations further comprise:

at the first validation node, receiving a transaction record from a transaction node, wherein the transaction record comprises a digital signature for the transaction record;

in response to receiving the transaction record, automatically obtaining a node identifier for the transaction node, based on the digital signature for the transaction record; and using the node identifier for the transaction node to determine whether the transaction node belongs to the validation group that comprises the first validation node.

5. A device according to claim 4, wherein the operations further comprise:

in response to a determination that the transaction node belongs to the validation group that comprises the first validation node, automatically validating the transaction record; and in response to successful validation of the transaction record, adding the transaction record to a new block record.

6. A device according to claim 5, wherein the operations further comprise:

generating a secure private key (SPK) for the first validation node, based on a root key in the processor of the first validation node; and in response to successful validation of the transaction record, using (a) the SPK and (b) an elliptic curve digital signature algorithm (ECDSA) to generate a digital signature for the new block.

7. A device according to claim 6, wherein the operations further comprise:

generating a node identifier for the first validation node; and wherein the operation of generating the SPK for the first validation node comprises generating the node identifier for the first validation node as a public key counterpart for the SPK.

8. An apparatus to support verification of a block record for a digital ledger that is distributed and partitioned, the apparatus comprising:

at least one non-transitory machine-accessible storage medium; and instructions in the machine-accessible storage medium, wherein the instructions, when executed by a device, enable the device to operate as a first validation node by performing operations comprising:

receiving a block record of a distributed digital ledger from a second validation node, wherein the block record comprises a payload of transactions, a header with a link to a previous block, and a digital signature for the block record;

in response to receiving the block record, automatically obtaining a node identifier for the second validation node, based on the digital signature for the block record;

using the node identifier for the second validation node to determine whether the second validation node belongs to a validation group that comprises the first validation node, wherein the validation group comprises a plurality of validation nodes to validate a ledger slice partitioned from the distributed digital ledger;

using an attestation service of a remote attestation node to determine whether the node identifier for the second validation node belongs to a node with a trusted processor;

using the digital signature for the block record to determine whether the digital signature was created with a private key that corresponds to the node identifier for the second validation node; and accepting the block record as valid only if the first validation node determines that (a) the second validation node belongs to a validation group that comprises the first validation node, (b) the node identifier for the second validation node belongs to a node with a trusted processor, and (c) the digital signature for the block record was created with a private key that corresponds to the node identifier for the second validation node.

9. An apparatus according to claim 8, wherein the operation of using the attestation service to determine whether the node identifier for the second validation node belongs to a node with a trusted processor comprises:

using the attestation service to determine whether the node identifier for the second validation node belongs to a node with a processor that has features comprising (a) support for a trusted execution environment (TEE) that prevents software outside of the TEE from accessing data in the TEE, (b) technology to generate at least one secure private key (SPK) based on a root key in the processor, and (c) technology to prevent the root key from ever being exposed outside of the processor.

10. An apparatus according to claim 8, wherein the operation of using the digital signature for the block record to determine whether the digital signature was created with a private key that corresponds to the node identifier for the second validation node comprises:

using the node identifier for the second validation node as a public key for the second validation node, and verifying that the digital signature for the block record was signed with a private key that corresponds to the public key for the second validation node.

11. An apparatus according to claim 8, wherein the operations further comprise:

at the first validation node, receiving a transaction record from a transaction node, wherein the transaction record comprises a digital signature for the transaction record;

in response to receiving the transaction record, automatically obtaining a node identifier for the transaction node, based on the digital signature for the transaction record; and using the node identifier for the transaction node to determine whether the transaction node belongs to the validation group that comprises the first validation node.

12. An apparatus according to claim 11, wherein the operations further comprise:

in response to a determination that the transaction node does not belong to the validation group that comprises the first validation node, automatically forwarding the transaction record to another validation node.

13. An apparatus according to claim 11, wherein the operations further comprise:
in response to a determination that the transaction node belongs to the validation group that comprises the first validation node, automatically validating the transaction record; and
in response to successful validation of the transaction record, adding the transaction record to a new block record.

14. An apparatus according to claim 13, wherein the operations further comprise:
generating a secure private key (SPK) for the first validation node, based on a root key in a processor of the first validation node; and
in response to successful validation of the transaction record, using (a) the SPK and (b) an elliptic curve digital signature algorithm (ECDSA) to generate a digital signature for the new block.

15. An apparatus according to claim 14, wherein the operation of generating the SPK for the first validation node comprises:
generating the SPK in a trusted execution environment (TEE) in the first validation node, wherein the TEE prevents software outside of the TEE from accessing data in the TEE.

16. An apparatus according to claim 14, wherein the operation of using (a) the SPK and (b) the ECDSA to generate the digital signature for the new block comprises:
using the SPK to generate the digital signature for the new block in a trusted execution environment (TEE) in the first validation node, wherein the TEE prevents software outside of the TEE from accessing data in the TEE.

17. An apparatus according to claim 14, wherein the operations further comprise:
generating a node identifier for the first validation node; and
wherein the operation of generating the SPK for the first validation node comprises generating the node identifier for the first validation node as a public key counterpart for the SPK.

18. An apparatus according to claim 17, wherein the digital signature for the new block enables other nodes to determine the node identifier for the first validation node.

19. An automated method to verify a block record for a digital ledger that is distributed and partitioned, the method comprising:
at a first validation node, receiving a block record of a distributed digital ledger from a second validation node, wherein the block record comprises a payload of transactions, a header with a link to a previous block, and a digital signature for the block record;
in response to receiving the block record, automatically obtaining a node identifier for the second validation node, based on the digital signature for the block record;
using the node identifier for the second validation node to determine whether the second validation node belongs to a validation group that comprises the first validation node, wherein the validation group comprises a plurality of validation nodes to validate a ledger slice partitioned from the distributed digital ledger;
using an attestation service of a remote attestation node to determine whether the node identifier for the second validation node belongs to a node with a trusted processor; and
using the digital signature for the block record to determine whether the digital signature was created with a private key that corresponds to the node identifier for the second validation node.

20. A method according to claim 19, further comprising:
accepting the block record as valid only if the first validation node determines that (a) the second validation node belongs to a validation group that comprises the first validation node, (b) the node identifier for the second validation node belongs to a node with a trusted processor, and (c) the digital signature for the block record was created with a private key that corresponds to the node identifier for the second validation node.

21. A method according to claim 19, wherein the operation of using the attestation service to determine whether the node identifier for the second validation node belongs to a node with a trusted processor comprises:
using the attestation service to determine whether the node identifier for the second validation node belongs to a node with a processor that has features comprising (a) support for a trusted execution environment (TEE) that prevents software outside of the TEE from accessing data in the TEE, (b) technology to generate at least one secure private key (SPK) based on a root key in the processor, and (c) technology to prevent the root key from ever being exposed outside of the processor.

22. A method according to claim 19, further comprising:
at the first validation node, receiving a transaction record from a transaction node, wherein the transaction record comprises a digital signature for the transaction record;
in response to receiving the transaction record, automatically obtaining a node identifier for the transaction node, based on the digital signature for the transaction record; and
using the node identifier for the transaction node to determine whether the transaction node belongs to the validation group that comprises the first validation node.

23. A method according to claim 22, further comprising:
in response to a determination that the transaction node belongs to the validation group that comprises the first validation node, automatically validating the transaction record; and
in response to successful validation of the transaction record, adding the transaction record to a new block record.

24. A method according to claim 23, further comprising:
generating a secure private key (SPK) for the first validation node, based on a root key in a processor of the first validation node; and in response to successful validation of the transaction record, using (a) the SPK and (b) an elliptic curve digital signature algorithm (ECDSA) to generate a digital signature for the new block.

25. A method according to claim 23, further comprising:
generating a node identifier for the first validation node; and
wherein the operation of generating the SPK for the first validation node comprises generating the node identifier for the first validation node as a public key counterpart for the SPK.

* * * * *